(12) United States Patent
Dobson et al.

(10) Patent No.: US 6,188,703 B1
(45) Date of Patent: *Feb. 13, 2001

(54) MULTIPLEXER FOR MULTIPLE MEDIA STREAMS

(75) Inventors: Hamish D. Dobson, Coquitlam; Robert Chow, Burnaby, both of (CA)

(73) Assignee: International Business Machines Corp., Armonk, NY (US)

( * ) Notice: Under 35 U.S.C. 154(b), the term of this patent shall be extended for 0 days.

This patent is subject to a terminal disclaimer.

(21) Appl. No.: 08/904,813

(22) Filed: Aug. 1, 1997

(51) Int. Cl.[7] ................................. H04J 3/16; H04J 3/24; H04J 3/04
(52) U.S. Cl. ..................... 370/537; 370/468; 370/474; 370/533
(58) Field of Search ..................... 370/389, 391, 370/521, 468, 394, 474, 473, 486, 487, 490, 522, 531, 538, 412, 229, 230; 348/384, 423; 364/239.6, 239.1, 237.1

(56) References Cited

U.S. PATENT DOCUMENTS

| | | | |
|---|---|---|---|
| 4,907,186 | 3/1990 | Racey | 364/900 |
| 5,159,447 | 10/1992 | Haskell et al. | 358/133 |
| 5,530,477 | 6/1996 | Coelho | 348/390 |
| 5,566,174 | * 10/1996 | Sato et al. | 370/84 |
| 5,751,356 | * 5/1998 | Suzuki | 348/390 |
| 5,835,498 | * 11/1998 | Kim et al. | 370/537 |
| 5,838,678 | * 11/1998 | Davis et al. | 370/389 |
| 5,859,660 | * 1/1999 | Perkins et al. | 348/9 |
| 5,875,007 | * 2/1999 | Zhung et al. | 348/845 |
| 5,914,962 | * 6/1999 | Fimoff et al. | 370/538 |
| 6,021,449 | * 2/2000 | Chow et al. | 710/57 |

* cited by examiner

*Primary Examiner*—Huy D. Vu
*Assistant Examiner*—M. Phan
(74) *Attorney, Agent, or Firm*—James E. Murray

(57) ABSTRACT

A multimedia terminal having a host processor, an audio and video encoder, a system time clock, and a multiplexer is provided. The encoders input elementary stream of data into the multiplexer. The multiplexer is comprised of a mux processor, a FIFO which buffers the elementary stream of data, and a mux logic circuit which preprocesses the elementary stream of data in accordance with an encoder/decoder protocol.

14 Claims, 4 Drawing Sheets

MULTIPLEXER FOR MULTIPLE MEDIA STREAMS

RELATED APPLICATIONS

The following patent applications are related to the application and are incorporated herein by reference:

| Title | Serial No. | Filing Date |
|---|---|---|
| Method And Apparatus For Controlling Elementary Stream Data Flow | 08/904,773 | 8/1/97 |
| Frame Buffer for Multimedia Terminal | 08/904,819 | 8/1/97 |
| Isolation of Multimedia Signals for Transmission and Processing Within a Multimedia Terminal | 08/904,778 | 8/1/97 |
| Internet Application Access Server Apparatus and Method | 08/905,197 | 8/1/97 |
| Network Communication Services Method and Apparatus | 08/904,939 | 8/1/97 |
| Method and Apparatus for Maintaining Directory Services for a Video Transmission Network | 08/904,774 | 8/1/97 |
| Method and Apparatus for Controlling Access in a Video Distribution Network | 08/904,776 | 8/1/97 |
| Method and Apparatus for Controlling Network Switches | 08/904,776 | 8/1/97 |
| Method and Apparatus for Controlling a Mixed Network of Analog and Digital Switches | 08/904,812 | 8/1/97 |

FIELD

The present invention relates to a method and apparatus for implementing and multiplexing multiple media streams in accordance with IOC/AEC 13818-1 MPEG-2 systems standard.

BACKGROUND

A multimedia system provides end-to-end service delivery by bundling high speed multimedia streams for transmission over ATM or other networks, unbundling them and using or storing them. Such streams may correspond to video, audio, signals used to control robotic applications, force-feedback applications, agile manufacturing and the like. A typical application may correspond to transmitting video and audio signals over an ATM network to a desired endpoint. The video signals may emanate as a digitized file from a file server or be an external analog video signal as from a camera, laser disc or VCR which must be digitized, compressed and then sent to a network interface (NIC) card for transmission into digital network for eventual reception by another multimedia terminal that would perform the inverse operation of demultiplexing, decoding and sending the decoded video signal to an analog television monitor.

Multimedia signals are typically high-bandwidth and time-sensitive in nature. A suitable compression scheme is, therefore, required such as MPEG-2 (Motion Picture Experts Group) and involves bit-rates in excess of 4 Megabits per second up to as high as 20 Megabits per second. One of the problems when faced with such high bandwidth signals is how to build an inexpensive high-bandwidth multiplexer to packetize and synchronize multiple media streams into one multiplex stream. One could solve the problem by using a very expensive RISC processor to implement the transport stream multiplexing operation but such a solution would not be commercially acceptable.

Accordingly, it is an object of the present invention to provide a multiplexer which uses a low cost microcontroller and programmable logic capable of pre-processing and parsing the bitstream before any processing by the microcontroller.

SUMMARY OF THE INVENTION

According to the invention there is provided a multimedia terminal having a host processor, an encoder and a system time clock. The output of the encoder is in the form of an elementary stream of data which is sent to a multiplexer. The multiplexer includes a mux processor, a FIFO and a mux logic circuit coupled to both the mux processor and the FIFO. The FIFO is operative to buffer the elementary stream of data and the mux logic is operative to preprocess the elementary stream of data in accordance with an encoder/decoder protocol.

The encoder/decoder protocol is preferably an MPEG-2 protocol.

The mux logic circuit monitors FIFO fullness and signals the mux processor when there is sufficient data in the FIFO to form the payload of a transport packet.

The mux logic circuit signals the mux processor when a start-code is in the transport packet payload that it is about to read.

The multiplexer includes a state of frame indicator machine in the mux logic circuit that determines whether a transport packet is to be treated as start of frame data. If that is the case, the mux processor creates a transport layer and an underlying packetized elementary stream (PES) layer. The mux processor creates a special transport packet with an adaptation field to contain a PES header and reads less elementary stream data to compensate for the bytes taken up by the PES header.

The mux logic circuit includes a start code tracking machine coupled to the FIFO operative to track start-codes through the FIFO.

A presentation time stamp (PTS) generator may be operative to latch the system time clock on access unit boundaries and to preformat the PTS in accordance with MPEG-2.

A program clock reference (PCR) time stamp generator may latch the system time clock to a PCR register once a read access is made to this register by the multiplexer.

A presentation time stamp may be inserted into the transport stream when the start of an encoded frame arrives at the mux interface.

The FIFO and mux logic circuit may operate on video elementary stream of data.

The FIFO and mux logic circuit may operate on audio elementary stream of data.

Pre-processing and parsing of the bitstream before arrival at the mux processor significantly reduces the number of operations/second required of the processor.

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION WITH REFERENCE TO THE DRAWINGS

Figure 1:
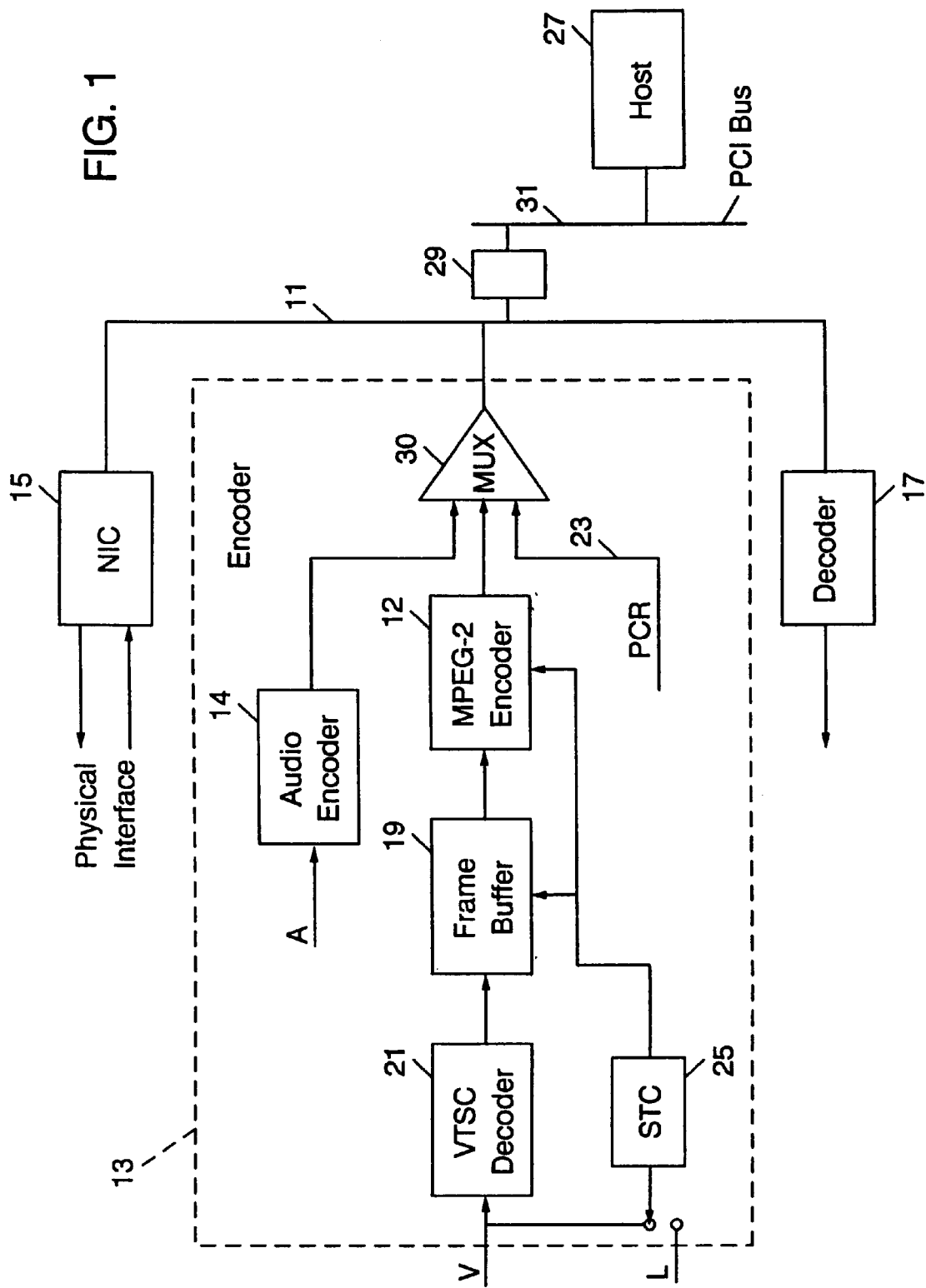
FIG. 1 is a schematic diagram of a multimedia network coupled to a PCI bus.

Multimedia terminals, such as multimedia desktop computers, consist of a variety of hardware and software modules. The hardware modules consist of physical devices such as plug-in cards that perform specific data and signal processing tasks, whereas the software modules comprise microprocessor software code that executes either on microprocessors located on the hardware modules, or on a host microprocessor. In the present case a set of such hardware is shown in FIG. 1 in which multimedia signals are transmitted between an encoder 13, a decoder 17 and a network interface device (NIC) 15 via a PCI bus 11. A host computer 27 may be coupled to the PCI bus 11 directly or through a bridge 29 from another PCI bus 31. For example, analog video signals are received by an NTSC decoder 21 which digitizes the analog input to provide a digital stream for the frame buffer 19. The frame buffer 19 synchronizes digital video data to the system time clock (STC) 25 and provides the synchronized signals to a MPEG-2 encoder. An audio encoder 14 provides audio data to the MUX 30. The program clock reference (PCR) 23 is a MPEG-2 preformatted packet obtained from a PCR register to which the STC 25 is latched once the mux 30 has read from this register. It is a time stamp that synchronizes the sending and receiving terminals and is generated at intervals specified by the host software just prior to being read by the NIC 15. It is multiplexed together with audio and video data and sent to the NIC 15 in packets in priority ahead of the audio and video data. At the receiving terminal (not shown) the transport stream is demultiplexed so that separate audio, video and PCR streams are reproduced.

Figure 2:
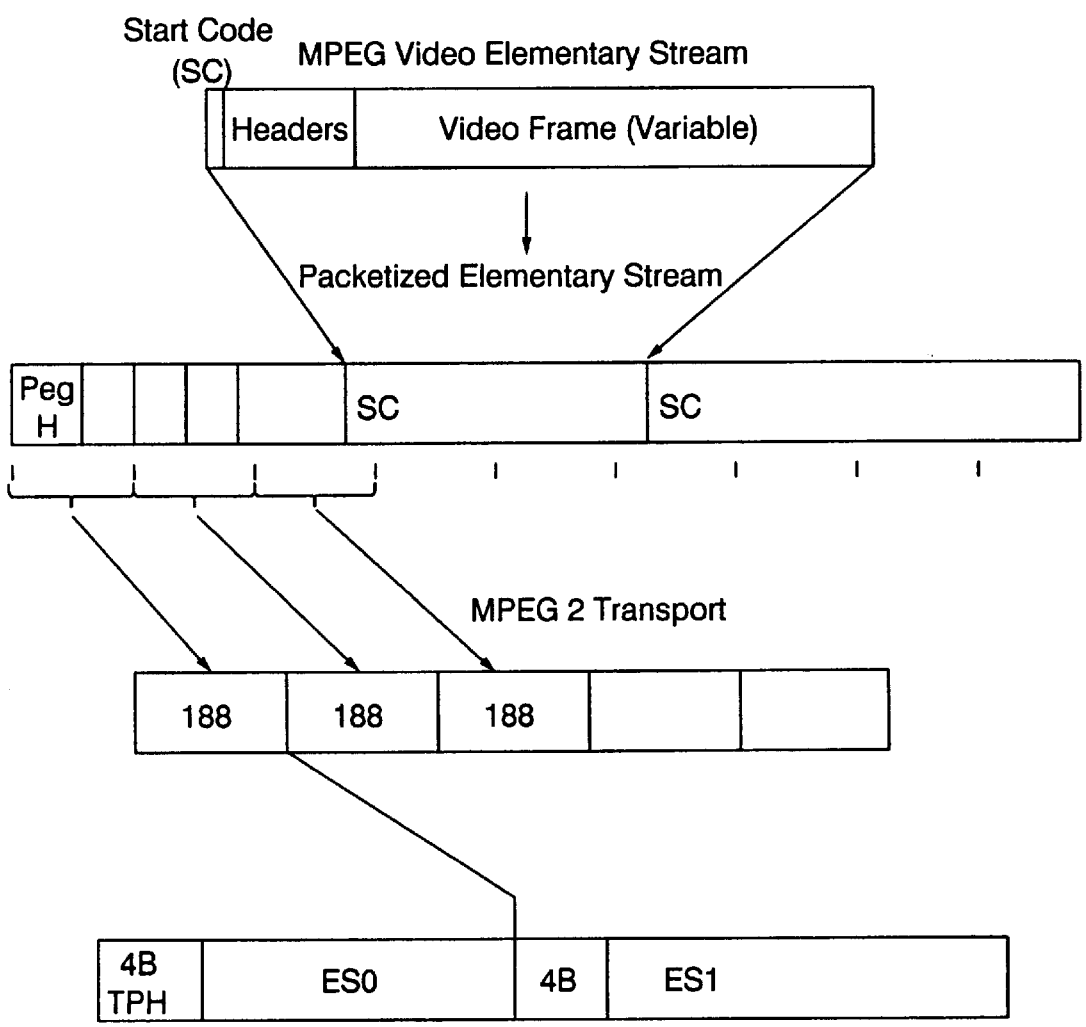
FIG. 2 is a schematic diagram of the packetizing of a MPEG-2 video elementary stream.

Referring to FIG. 2 each video frame has a start code (SC) at the beginning of the frame followed by other header information. The MPEG video elementary stream is formed into a packetized elementary stream which includes a Packetized Elementary Stream header (PES Header) containing Presentation Time Stamp (PTS) information. The PES header is inserted every n access units where an access unit is a frame of compressed video or audio data. The PTS contains the time at which the audio or video frame is encoded. In addition, each video or audio frame including its start code is concatenated after the PES header. From the packetized elementary stream an MPEG-2 transport stream is formed by breaking up separate PES streams into transport packet payloads. Transport packet header information is generated (4 bytes) appended to 184 bytes of payload data packets containing either audio or video data are built depending upon which data is ready for insertion first. This process is continued until a start code for either audio or video frames is encountered at which point a new PES packet is started.

Figure 3:
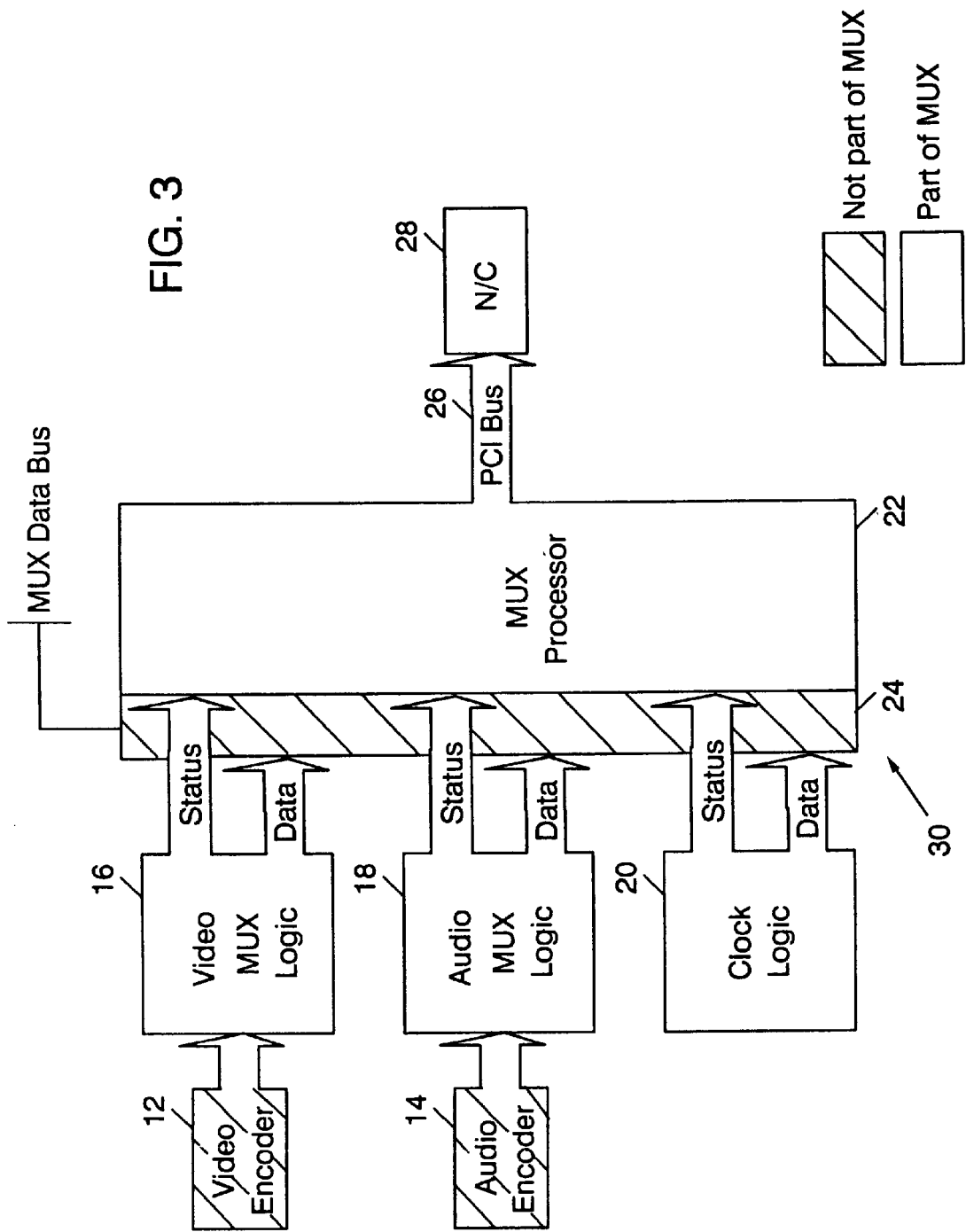
FIG. 3 is a block diagram showing the multiplexer.

Referring to FIG. 3, the MPEG-2 Encoder 12 delivers an MPEG-2 video elementary stream to the video mux logic 16 and the audio encoder 14 generates an elementary stream which it sends to the audio mux logic circuit 18 coupled to the MUX data bus. The mux logic circuits 16 and 18 are associated with FIFO's 32 (see FIG. 4) which buffer the video and audio elementary stream data and, when there is sufficient video data in the FIFO 32 (see FIG. 4) to form the payload of an MPEG-2 transport packet, signals a mux microprocessor 22 coupled to NIC 28 by PCI bus 26. A video FIFO fullness counter 40 (see FIG. 4) then keeps track of the number of bytes of video data in the FIFO 32 at any time. An interrupt generator 42 interrupts the mux 30 whenever the number of bytes in the video FIFO 32 exceeds 184.

Figure 4:
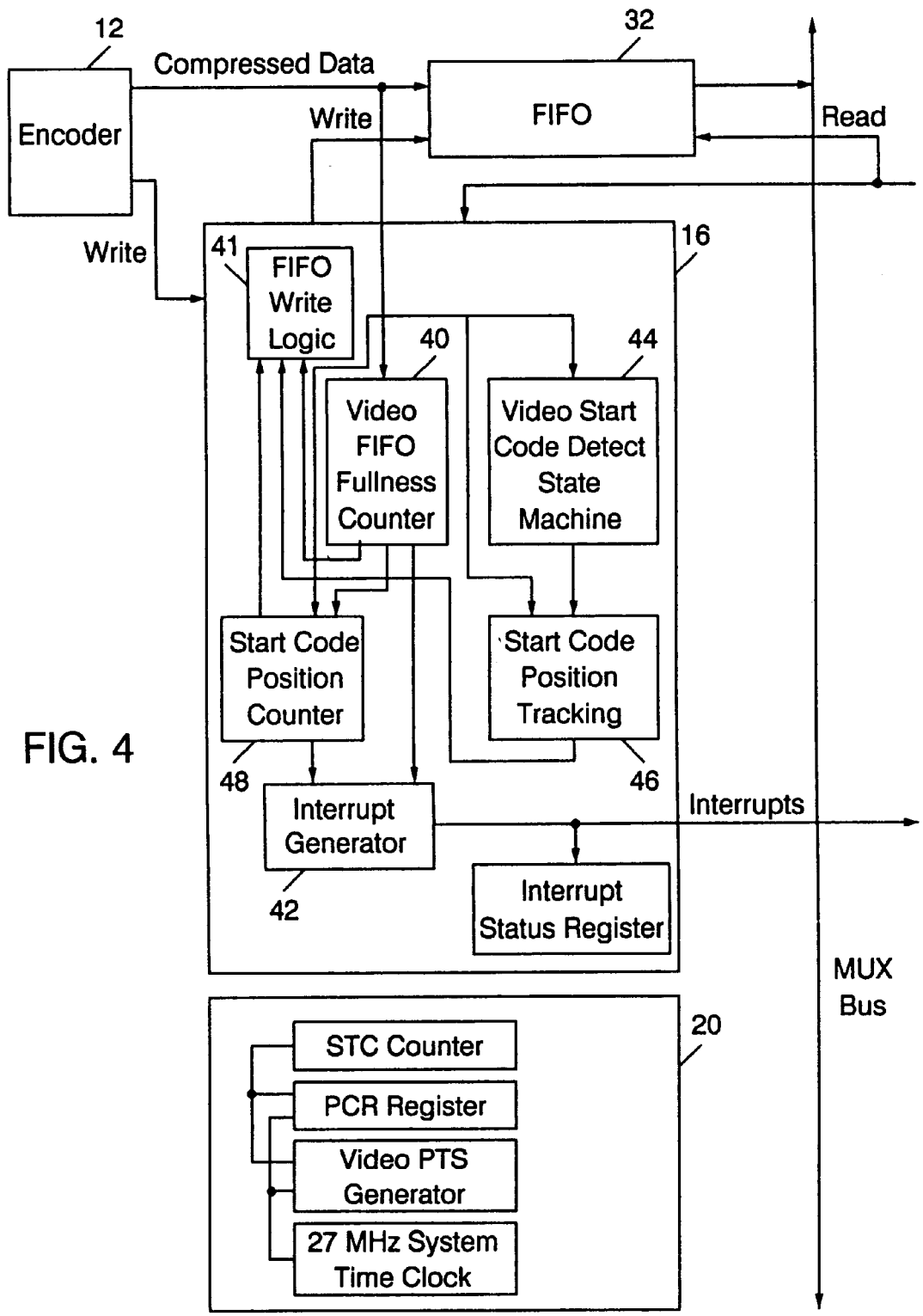
FIG. 4 is schematic diagram showing the functions of both the video and audio mux logic circuits with associated encoder and FIFO.

As further seen in FIG. 4, compressed data from the encoder 12 is directed both to a FIFO 32 and to the mux logic circuitry 16. The mux processor 22 is alerted when there is a video start-code in the transport packet payload that it is about to read. This allows the mux processor 22 (in FIG. 3) to create the transport layer at the same time it is creating the underlying PES layer. If the mux 30 is aware that an access unit starts in the next transport packet payload it an create a special transport packet with an adaptation field to contain the PES packet header. The mux 30 will also realize that as a result of the PES header, the transport packet payload will be smaller and it will subsequently read less elementary stream data from the FIFO 32.

Preprocessing such as this allows the mux processor 22 to simultaneously do PES and transport layer packetization without using extra instruction cycles transferring data to temporary storage. As data is read into the compressed data FIFO 32 scanning for start codes by a video start code detect state machine 44 is carried out to determine when a video start-code is in the next TS (time stamp) payload. The start code detect state machine 44 detects start codes on byte boundaries and provides input to the start code position tracking module 46. When a start code is detected, the value in the FIFO-fullness-counter 40 is latched into another counter called the start-code position counter 48. The start-code position counter 48 only counts down on compressed data FIFO reads by the mux 30. Preprocessing such as this removes instruction cycle intensive tasks such as start-code scanning from the microprocessor 22. Interrupt generation logic consists of comparators (not shown) which compare the values of the two counters, namely, the FIFO fullness counter 40 and the start-code position counter 48 with the threshold value of 184 bytes.

Data entry into the FIFO 32 is controlled by FIFO write logic 41 in the mux logic circuits 16 and 18. Integrating the FIFO write logic 41, start-code detect state machine 44, FIFO-fullness counter 40 within the same logic block allows these three systems to exchange information easily.

The audio mux logic circuit 18 performs similar functions to the video mux logic circuit 16. It buffers the audio elementary stream data, signals the mux processor 22 when there is sufficient audio data in the FIFO to form the payload of a MPEG-2 transport packet and signals the mux processor 22 when the data in the current payload contains an audio start-of-frame. Audio logic is implemented in exactly the same way as the video logic and is implemented in the same logic block.

The clock logic 20 maintains a 27 MHz system time clock as per the MPEG-2 standard. It also generates video and audio presentation time stamps (PTS) by latching the system time clock (STC) on access unit boundaries. The mux processor 22 is interrupted when a new PTS is available. The PTS is made available to the mux processor 22 and is pre-formatted as per the MPEG-2 standard so that the mux 30 doesn't need to expend effort on bit-shifting operations. The clock logic 20 also generates program clock reference (PCR) time-stamps. The STC is latched to the PCR register once the mux 30 reads from this register. The PCR is pre-formatted as per the MPEG-2 standard so that the mux 30 doesn't need to expend effort on bit-shifting operations.

Treatment of the data by the mux processor 22 involves processing of the video elementary stream. The video processing algorithm in the mux processor 22 packetizes the video elementary streams by adding PES headers and time stamps as specified by the host 27. The packetized elementary stream is then segmented into transport packets and inserted into the payload data unit (PDU) queue.

Every time the video mux logic 16 buffers enough data to create a transport packet (184 bytes), the mux processor 22 is signaled. The mux processor 22 processes the data in one of two ways: the first method is to treat the data as ordinary payload data, and the other is to treat it as start-of-frame (SOF) data. The method of treatment is determined by whether a start-of-frame (SOF) indicator (not shown) is set by the video mux logic 16.

Ordinary data is simply encapsulated with transport packet headers and queued into the PDU queue. However, start-of-frame data is counted and the count is used to determine whether a presentation time stamp is inserted. The presentation time stamp is captured by the mux processor 22 when it is signaled by the video mux logic block that a frame is being encoded. The interval at which the PTS must be inserted is determined by the host 27, but it cannot exceed 700 milliseconds. Since the video frames are fixed intervals, a count of the start-of-frame can be used to determine when to insert the PTS.

Rate control may be necessary when the channel bandwidth is exceeded by the elementary stream video data and the data is backed up into the video FIFO 32.

The basic algorithm is:

--- if there is enough data to form a transport packet PDU
(
  if it contains an video SOF
  (
    count and compare the number of video SOF since last PES header
    if number of SOF counted indicate time to insert PTS
    (
      read PTS and add offset
      create and insert the PES headers
      encapsulate the PES header and data with the
      transport packet header
      insert into the PDU queue
    )
  )
  else
  (
    encapsulate the data with the transport packet header insert into the PDU queue
  )
)

---

The audio processing section packetizes the audio elementary streams by adding PES headers and time stamps as specified by the host 27. The packetized elementary stream is then segmented into transport packets and inserted into the PDU queue.

Every time the audio mux logic buffers enough data to create a transport packet (184 bytes), the mux processor 22 is signaled. The mux processor 22 processes the data in one of two ways: the first method is to treat the data as ordinary payload data, and the other is to treat it as a start-of-frame (SOF) data. The method of treatment is determined by whether the start-of-frame indicator is set by the audio mux logic 18.

Ordinary data is simply encapsulated with transport packet headers and queued into the PDU queue. However, start-of-frame data is counted and the count is used to determine whether a presentation time stamp is inserted. The presentation time stamp is captured by the mux processor 22 when it is signaled by the audio mux logic block that a frame is being encoded. The interval at which the PTS must be inserted is determined by the host, but it cannot exceed 700 milliseconds. Since the audio frames are fixed intervals, a count of the start-of-frame can be used to determine when to insert the PTS.

The basic algorithm is:

--- if there is room in the PDU queue
(
  if there is enough data for a transport packet
  (
    if it contains an audio SOF
    (
      count and compare the number of audio SOF since last PES header
      if number of SOF counted indicate time to insert PTS
      (
        read PTS and add offset
        create and insert the PES headers
        encapsulate the PES header and data with the
        transport packet header
        insert into the PDU queue
      )
    )
    else
    (
      encapsulate the data with the transport packet header
      insert into the PDU queue
    )
  )
)

---

The PCR program clock reference packet is generated at intervals specified by the host software. Due to the sensitive nature of the time reference to jitter, the actual reference value is only captured just prior to being read by the NIC 15 to avoid any buffering delay. This block serves to set a flag to indicate that such PDU is to be generated by the NIC interface section.

The basic algorithm used here is

--- if PCR generation interval has expired
(
  set flag to indicate that a PCR PDU is to be generated and sent to the NIC
)
else
(
  if there are enough transport packets in the PDU queue to form a PDU
  (
    initiate transfer to the NIC
  )
)

---

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

We claim:

1. A multimedia terminal having a host processor, an encoder, a system clock (STC), said encounter's output being input as an elementary stream of video or audio data into a multiplexer, said multiplexer comprising:
   (a) a mux processor;
   (b) a FIFO buffer operative to buffer said elementary stream of video or audio data;
   (c) a mux logic circuit coupled to said mux processor and said FIFO buffer, operative to preprocess said elementary stream data from said encoder in accordance with an encoder/decoder protocol wherein said mux logic circuit includes a start code position tracking machine coupled to said FIFO and operative to track start codes through said FIFO; and
   (d) a fullness counter coupled to said FIFO buffer operative to keep track of the number of bytes of data in said FIFO buffer and an interrupt generator coupled to said mux processor and operative to generate an interrupt for said mux processor when the number of bytes in said FIFO buffer is sufficient to form a payload of a transport packet.

2. A multiplexer according to claim 1 wherein said encoder/decoder protocol is an MPEG-2 protocol.

3. A multiplexer according to claim 1, wherein said mux logic includes a start code position tracking machine coupled to said FIFO buffer operative to track start codes through said FIFO buffer.

4. A multiplexer according to claim 1, wherein said mux logic circuit signals said mux processor when it is about to read a start-code in the payload of a transport packet.

5. A multimedia terminal having a host processor, an encoder, a system clock (STC), said encoder's output being input as an elementary stream of data into a multiplexer, said multiplexer comprising:
   (a) a mux processor;
   (b) a FIFO buffer operative to buffer said elementary stream of data;
   (c) a mux logic circuit coupled to said mux processor and said FIFO buffer, operative to preprocess said elementary stream data from said encoder in accordance with an encoder/decoder protocol; and
   (d) a presentation time stamp (PTS) generator operative to latch the system time clock on access unit boundaries and to preformat the PTS in accordance with said encoder/decoder protocol.

6. A multiplexer according to claim 5 wherein said mux logic circuit monitors FIFO fullness and signals said mux processor when there is sufficient elementary stream of data in said FIFO buffer to form a payload of a transport packet.

7. A multiplexer according to claim 5, wherein said mux processor captures a presentation time stamp produced by said presentation time stamp generator in response to receipt of a signal from said mux logic circuits that a frame is being encoded, the presentation time stamp being inserted into a transport stream at an interval determined by said host processor.

8. A multimedia terminal having a host processor, an encoder, a system clock (STC), said encoder's output being input as an elementary stream of data into a multiplexer, said multiplexer comprising:
   (a) a mux processor;
   (b) a FIFO buffer operative to buffer said elementary stream of data;
   (c) a mux logic circuit coupled to said mux processor and said FIFO buffer, operative to preprocess said elementary stream data from said encoder in accordance with an encoder/decoder protocol; and
   (d) a start of frame indicator machine set by said mux logic circuit to indicate to said mux processor that a transport packet; is to be treated as start-of-frame (SOF) data whereby said mux processor creates a transport layer at the same time it creates an underlying PES layer by creating a special transport packet with an adaptation field to contain a PES packet header and allowing said mux processor to read less elementary stream data from the FIFO buffer to account for the bytes taken up by the PES packet header.

9. A multimedia terminal having a host processor, an encoder, a system clock (STC), said encoder's output being input as an elementary stream of data into a multiplexer, said multiplexer comprising:
   (a) a mux processor;
   (b) a FIFO buffer operative to buffer said elementary stream of data;
   (c) a mux logic circuit coupled to said mux processor and said FIFO buffer, operative to preprocess said elementary stream data from said encoder in accordance with an encoder/decoder protocol; and
   (d) a Program Clock Reference (PCR) time stamp generator which latches the system time clock to a PCR register once this register is read by said multiplexer and pre-formats said PCR for an encoder/decoder protocol.

10. A multimedia terminal having a host processor, an encoder, a system clock (STC), said encoder's output being input as an elementary stream of data into a multiplexer, said multiplexer comprising:
    (a) a mux processor;
    (b) a FIFO buffer operative to buffer said elementary stream of data;
    (c) a mux logic circuit coupled to said mux processor and said FIFO buffer, operative to preprocess said elementary stream data from said encoder in accordance with an encoder/decoder protocol;
    (d) a start code position counter;
    (e) a FIFO buffer fullness counter having an input coupled to a compressed data input to said FIFO and an output coupled to said start code position counter; and
    (f) a start code detect state machine coupled to a compressed data input of said FIFO buffer and to said FIFO buffer fullness counter operative to latch the value in said FIFO buffer fullness counter into said start-code position counter upon said state machine detecting a start code and to count down on compressed data FIFO buffer reads, whereby said multiplexer is provided with advance knowledge of whether a new frame begins with a next available packet of elementary stream data.

11. A multimedia terminal having a host processor, an encoder, a system clock (STC), said encoder's output being input as an elementary stream of video data into a multiplexer, said multiplexer comprising:
    (a) a mux processor;
    (b) a FIFO buffer operative to buffer said elementary stream of video data;
    (c) a max logic circuit coupled to said mux processor and said FIFO buffer, operative to preprocess said elementary stream data from said encoder in accordance with an encoder/decoder protocol;
    (d) a FIFO buffer fullness counter having an input coupled to an output of said encoder and an output coupled to a FIFO buffer write logic circuit operative to measure the amount of data in said FIFO buffer and to disable the inputting of compressed data into said FIFO buffer when said FIFO buffer is full; and a start code detect state machine and a start code position tracking circuit coupled to an input of said FIFO and operative to track the position of a start code marking the beginning of the elementary stream whereby frame sizes are monitored even when data is not being input to said FIFO.

12. A multiplexer according to claim 11, including a start code detect state machine coupled to said compressed data, and a start code position tracking circuit coupled to an input of said FIFO operative to track the position of a start code marking the beginning of the elementary stream whereby frame sizes are monitored even when data is not being input to said FIFO.

13. A multimedia terminal having a host processor, an encoder, a system clock (STC), said encounter's output being input as an elementary stream of video or audio data into a multiplexer, said multiplexer comprising:

(a) a mux processor;

(b) a FIFO buffer operative to buffer said elementary stream of video or audio data;

(c) a mux logic circuit coupled to said mux processor and said FIFO buffer, operative to preprocess said elementary stream data from said encoder in accordance with an encoder/decoder protocol, wherein said mux logic circuit signals said mux processor when it is abut to read a start-code in the payload of a transport pocket; and (d) a fullness counter coupled to said FIFO buffer operative to keep track of the number of bytes of data in said FIFO buffer and an interrupt generator coupled to said mux processor and operative to generate an interrupt for said mux processor when the number of bytes in said FIFO buffer is sufficient to form a payload of a transport packet.

14. A multimedia terminal having a host processor, an encoder, a system clock (STC), said encounter's output being input as an elementary stream of video or audio data into a multiplexer, said multiplexer comprising;

(a) a mux processor;

(b) a FIFO buffer operative to buffer said elementary stream of video or audio data;

(c) a mux logic circuit coupled to said mux processor and said FIFO buffer, operative to preprocess said elementary stream data from said encoder in accordance with an encoder/decoder protocol wherein said encode/decoder protocol is a MPEG-2 protocol; and (d) a fullness counter coupled to said FIFO buffer operative to keep track of the number of bytes of data in said FIFO buffer and an interrupt generator coupled to said mux processor and operative to generate an interrupt for said mux processor when the number of bytes in said FIFO buffer is sufficient to form a payload of a transport packet.

* * * * *